United States Patent [19]

Heller et al.

[11] 4,291,819
[45] Sep. 29, 1981

[54] HIGH SPEED DISPENSER FOR ELECTRICAL COMPONENTS

[75] Inventors: Martin G. Heller, 68 Harvey Dr., Short Hills, N.J. 07078; Joel Rudder, Rockaway; Stanley J. Arasim, Jr., West Milford, both of N.J.

[73] Assignee: Martin G. Heller, Short Hills, N.J.

[21] Appl. No.: 138,177

[22] Filed: Apr. 7, 1980

[51] Int. Cl.³ .............................................. B65G 59/06
[52] U.S. Cl. ..................................... 221/298; 221/264
[58] Field of Search ............... 221/232, 238, 251, 263, 221/264, 271, 273, 276, 292, 293, 298; 209/574

[56] References Cited

U.S. PATENT DOCUMENTS 3,304,499 2/1967 Vincze ........................... 221/298 X Primary Examiner—Stanley H. Tollberg
Attorney, Agent, or Firm—Ralph R. Roberts

[57] ABSTRACT

This dispensing apparatus provides a high speed feeding device with a one-at-a-time positive delivery of an electrical component having a generally cylindrical body and two wire-like members. The members are disposed to extend one from each end of the body and substantially central thereof. The dispensing apparatus includes a zig-zag feeder or chute from which the electrical component is delivered to cam actuated plunger means which is reciprocated to present a first supportive position and in response to a cam displacement the component is dropped into a receiver pocket and then moved to a discharge position whereat the transferred component is delivered to other operations.

10 Claims, 6 Drawing Figures

HIGH SPEED DISPENSER FOR ELECTRICAL COMPONENTS

BACKGROUND OF THE INVENTION

1. Field of the Invention

With reference to the field of art as established in and by the U.S. Patent Office this invention is believed to be found in the general class entitled "Article Dispensing" (Class 221) and in the subclasses therein entitled "Spring biased to discharging position" (subclass 271) and also to the subclass entitled "Cam" (subclass 273) and to the subclass entitled "Spring biased" (subclass 276).

2. Description of the Prior Art

The high speed dispensing of electrical components has been the subject of many patents and also many non-patented commercial apparatus. Zig-zag chutes for gravity assembly and discharge of tubular shaped electrical components are well known and used since a zig-zag chute reduces the gravity pressure on the single file arrayed components. The use of cam actuated slides for delivery of components is not new but a high speed dispenser in the present invention is novel.

In the course of a pre-Ex search the following U.S. Patents were noted: No. 979,318 to MARRIOTT as issued Dec. 20, 1910; U.S. Pat. No. 1,308,258 to ROSE as issued July 1, 1919; U.S. Pat. No. 1,449,864 to LILLIS as issued Mar. 27, 1923; U.S. Pat. No. 2,600,961 to BIEHL as issued June 17, 1952; U.S. Pat. No. 2,761,588 to SHIELDS as issued on Sept. 4, 1956 and U.S. Pat. No. 3,442,200 to BABEL as issued on May 6, 1969. These and known apparatus as used in the industry do not suggest the high speed device disclosed. The apparatus of this invention is rather simple in its design and operation but is contemplated to provide a one-at-a-time discharge of a tubular electrical component at delivery rates in excess of ten thousand units per hour. The actual reduced-to-practice apparatus delivers components received from the bottom end of a zig-zag chute at rates from ten to forty thousand units per hour.

SUMMARY OF THE INVENTION

This invention may be summarized, at least in part, with reference to its objects.

It is an object of this invention to provide, and it does provide, a high-speed dispensing apparatus for electrical components having like-sized tubular bodies with wire-like conductors extending from each end of the body. This dispenser receives loose components from a zig-zag chute and spring-biased plungers are reciprocated by cam means to discharge these components one-at-a-time from the apparatus.

It is a further object of this invention to provide, and it does provide, a high speed dispensing apparatus for tubular electrical components. This apparatus receives loose components from a delivery chute and, one-at-a-time, delivers said component to further operations. Said dispenser has two plungers, both of which are spring biased to determined limits. A cam means actuates the plungers to move a receiving notch in way of the wire ends of the component and then to transfer and discharge the component from the dispensing apparatus.

In brief, this apparatus includes a gravity actuated delivery chute into which loose or dereeled components are fed to the one-at-a-time high speed delivery apparatus. A rear plunger is spring biased forwardly to a selected position at which the forward end of the rear plunger closes off the delivery of components from the above chute. A second or front plunger has a wire receiving notch in its inwardly directed end and is also spring biased toward a cam means. This cam means engages and moves the second plunger toward the rear plunger and displaces it sufficiently to allow the lowermost electrical component to drop to the extent that the extending ends enter the notch. The cam is then moved to its original position whereat the component is displaced by the spring-biased plunger and the second plunger continues to uncover a delivery path and a discharge of the component is achieved.

In addition to the above summary the following disclosure is detailed to insure adequacy and aid in understanding of the invention. This nts a side view, partly diagrammatic, and showing the high-speed dispensing apparatus of this invention;

FIG. 2 represents a plan view of the apparatus, this view taken on the line 2—2 of FIG. 1 and looking in the direction of the arrows;

FIG. 3 represents, in an enlarged scale, a diagrammatic side view of the dispensing apparatus and showing the dispenser with the rear plunger in its most forward position in which it inhibits downward movement of the component;

FIG. 4 represents the apparatus of FIG. 3 but with the rear and front plungers moved sufficiently toward the rear to enable the component and its wire ends to drop into a receiving notch;

FIG. 5 represents the apparatus of FIGS. 3 and 4 but with the front plunger in its forward most position and the rear plunger also in its forward most position and as in FIG. 3 the discharge slot is open to the bottom for discharge of the electrical component, and FIG. 6 represents an isometric view of a typical electrical component as dispensed one-at-a-time from the apparatus at high speed.

In the following description and in the claims various details are identified by specific names for convenience. These names are intended to be generic in their application. Corresponding reference characters refer to like members throughout the several figures of the drawing.

The drawing accompanying, and forming part of, this specification disclose details of construction for the purpose of explanation but structural details may be modified without departure from the concept and principles of the invention and the invention may be incorporated in other structural forms than shown.

DESCRIPTION OF THE PREFERRED EMBODIMENT OF FIGS. 1 and 2

Referring next and now to the single sheet of drawings there is shown a side and plan view of the high speed dispenser. This apparatus is disposed to receive loose electrical components whether from a dereeling apparatus or from a loose supply. Typically the components are substantially alike, at least physically, in that each has a tubular body 10 and from each end and generally central thereof there are wires or wire-like projecting ends 12 and 13. A chute 14, customarily of sheet metal, has sides 16 and 17 in which are formed zig-zag tracks 18 whose sides are spaced apart from each other to provide a slide guide for the wire ends 12 and 13.

A pair of rear plungers 22 and 24 are slidably carried in support bearing blocks 26 and 28. A spacer 30 is disposed between bearing blocks 26 and 28 and establishes the distance between the sides 16 and 17 of the chute 14. The spacer 30 insures that the tubular body 10 of the electrical component is freely slidable in the chute 14. The rear plungers are conventionally made square and the groove provided in the blocks 26 and 28 slidably retain these plungers 22 and 24. Bottom cover plates 32 and 34 are secured respectively to bearing blocks 26 and 28. These cover plates may extend forwardly (rightwardly) to support the plungers and to provide mounting and positioning means for the apparatus.

The rear plungers are biased forwardly by like springs 36 which, as shown, are tension springs. Each rear portion of these springs is mounted on a pin 38 which is secured in a tight mounting hole in the rear portion of the plunger. This pin 38 therefore not only acts as a post for the spring 36 but also provides a stop means for the forward movement of a rear plunger. Post or pin 40 provides the mounting means for the forward (right) end of the spring 36. Other spring bias constructions may be provided that urge the rear plungers forwardly. Stop means must be provided to insure that a rear plunger is at its determined forward limit sufficient to cause the wires 12 and 13 of the component to rest on the top surface of a rear plunger.

Forward bearing blocks 44 and 46 not only carry the forward ends of the sides 16 and 17 of the chute 14 but also slidably carry like forward plungers 48 and 49. These plungers have their rear or inwardly directed ends formed with a notch 50 or 51. The bearing blocks are formed with square slide grooves for the forward plungers 48 and 49. These grooves are covered by plate members 54 and 55 which are secured to the respective bearing blocks and support the plungers and also provide mounting and positioning means for the apparatus on a bench or the like. Like springs 57 and 58 are carried on the plungers 48 and 49. Pins 60 and washers 62 are also depicted. A spacer 64 is also shown in FIG. 2 and this spacer is disposed between the bearing block 44 and 46 and like spacer 30 establishes the desired or determined distance between the sides of the chute 14. The forward (right) ends of each of the plungers 48 and 49 carry rounded ends or bearings for minimizing the wear on the ends of the plunger. A cam 66 is carried by a rotating shaft 68 to actuate the plungers.

APPARATUS IN RELAXED CONDITION OF FIG. 3

Referring next to an enlarged and diagrammatic side view of FIG. 3 there is shown the high speed component dispenser in its receiving or relaxed condition. The tubular bodies 10 of the components are carried by gravity downwardly. The zig-zag track 18 guides the wire ends 12 and 13. The lowermost component is prevented from further downward movement by the wires 12 and 13 as they reach the top surface of the rear plungers 22 and 24. Springs 36 urge these plungers forwardly until stopped in their desired forward position by pin 38. The cam 66 is at its minimum throw so that plungers 48 and 49 are to their rightward or forward limit.

APPARATUS IN RECEIVING CONDITION OF FIG. 4

Referring next to the diagrammatic side view of FIG. 4 it is to be noted that cam 66 has been rotated one half revolution (one hundred eighty degrees). The front plungers 48 and 49 have been rightwardly moved by the rotation of the cam to bring notches 50 and 51 into receiving alignment with the wire ends 12 and 13 and the discharge end of the zig-zag chute track 18. The electrical component now drops so that the wire ends 12 and 13 enter into and rest in the notch ends 50 and 51 of the forward plungers 48 and 49. The rear plungers 22 and 24 are pushed back (leftwardly) by the engagement and rearwardly movement or thrust of the cam-moved, forward plungers 48 and 49. It is to be noted that the next-above component is held from the notch formed in the front plungers 48 and 49 by the body of the component now in the notch. The bodies 10 of the components are greater in diameter than the depth of the notches 50 and 51. The apparatus, as to its size, is strictly a function of the construction of the component. The chute is made to provide an easy slide guide for the body 10 of a component. The width of the zig-zag track 18 is sized to easily guide the wire ends 12 and 13 of the component. The depth and width of the notches 50 and 51 are selected according to the size of the body 10 of the component and the diameter of the wire ends 12 and 13.

APPARATUS IN DELIVERING CONDITION OF FIG. 5

Referring next and finally to the diagrammatic view of FIG. 5 the representations of FIGS. 3 and 4 are continued with the cam 66 now rotated another half revolution (another one hundred eighty degrees) from the position of FIG. 4. The plungers 22 and 24 which are the rear plungers have returned to their original position to carry and are in way of the wire ends 12 and 13 of the conductor. In the meantime the forward plungers 48 and 49 by bias of the springs 57 and 58 have been moved forwardly to follow the throw or the cam 66 as it is rotated. The left or inward ends of the plungers 48 and 49 are moved forwardly to the right and open the exit slot between the forward and rear plungers. The chute sides 16 and 17 are formed with a downwardly directed edge 70 as seen in this FIG. 5. This edge of the sides 16 and 17 pushes the wires 12 and 13 off the plunger notches 50 and 51 of the now moved forward plungers and the component falls.

The cam 66 may be a bearing to reduce friction or the ends of the plungers 48 and 49 may have rollers but as this apparatus often operates at speeds up to forty thousand units per hour, and these speeds are greater than antifriction bearings are often capable of operating, an oil mist or drip means is often employed for such a lubrication need. Springs 57 and 58 are shown on the plungers 48 and 49 but tension springs and pins much like that used on the rear plungers can also be provided. Tension springs and compression springs have been shown but this is not to preclude using resilient members such as rubber. The plungers, both rear and forward, are contemplated as being square; but round members with a keyway and irregular shapes such as hex may also be employed. It is to be noted that the wire ends are usually less than one-sixteenth of an inch in diameter so that the reciprocal movement of the plungers is usually only a few thousandths of an inch greater than twice this distance. The wire ends may be of the same diameter or may be of a dissimilar one. If of a dissimilar diameter the components are fed from a dereeler and the notch size as to width and depth is formed according to said wire size. The discharged part usually is fed to a wheel whereat bending, trimming and/or other operations are performed.

As the length of the body 10 is made to suit a particular capacity component the spacing means 30 and 64 need to be adjustable. As reduced-to-practice the spacers 30 and 64 are like steel shafting or rod lengths with one end having a threaded hole with a cap screw mounted therein to provide a rotatable but fixed retainer. In blocks 28 and 46 the other ends of these spacer shafts are threaded and are correspondingly mounted in threaded apertures in blocks 26 and 44. A clamp or nut secures the shaft in the desired rotated and adjusted position. Other means for adjusting the spacing between the walls of the chute may be provided if desired.

It is to be noted that the notches 50 and 51, for receiving said wire ends 12 and 13 of the electrical component, are shown as formed on the forward plungers. An alternate method can have rear plungers adapted to have these notches but the cam action and the chute ejector edge 70 would have to be altered to the extent that the downward discharge slot would provide for the disengagement of the wire ends from the receiving notch as the rear plungers are moved. The angle of the guide track 18 is merely a matter of selection as to the manner of separating the components into loose components. The zig-zag path shown is sized to be suitable for the rapid feeding of loose components to said dispenser apparatus. The chute sides may extend downwardly to meet other apparatus in which other operations are performed. The cam 66 is depicted as a single throw cam but this is not to preclude a multilobe or throw cam. It is only necessary that the throw of the cam and the lobe portions be sufficiently sloped so that an effective cam action can be produced. Springs are shown as they are economical but, if desired, pneumatic cylinders or electrical coil means could also be provided.

Terms such as "left," "right," "up," "down," "bottom," "top," "front," "back," "in," "out," and the like are applicable to the embodiment shown and described in conjunction with the drawing. These terms are merely for the purposes of description and do not necessarily apply to the position in which the high speed dispenser for tubular electrical components may be constructed or used.

While a particular embodiment of the dispenser has been shown and described it is to be understood the invention is not limited thereto since modifications may be made within the scope of the accompanying claims and protection is sought to the broadest extent the prior art allows.

What is claimed is:

1. A high speed dispenser adapted for loose electrical components characterized in that each component has like-sized tubular bodies in both diameter and length and from the ends of each body extend wire-like conductors which are substantially central of each body, said dispenser including:
   (a) a chute having opposed wall portions with parallel inner faces defining a spaced apart guide for the bodies of said electrical components;
   (b) a track path provided in each wall portion of the chute, said track disposed to receive and freely guide and confine a wire end of a component as the tracks receive and deliver the loose components by gravity to a lower end of the chute;
   (c) a pair of rear support and bearing blocks including means to support the chute in a desired orientation;
   (d) a pair of reciprocative rear plungers slidably carried in said blocks;
   (e) biasing means for moving each plunger forwardly to a determined at-rest position and with the upper surface of each plunger in way of the discharge end on the track so as to receive and engage in a supporting manner the wire ends of the lowermost component;
   (f) spacer means for positioning the rear bearing blocks, the chute and rear plungers at a determined apart distance;
   (g) a pair of front support and bearing blocks including means for securing and supporting said chute;
   (h) a pair of reciprocative front plungers slidably carried in said front blocks;
   (i) biasing means for urging the front plungers in a direction away from the rear plungers;
   (j) a notch of determined width and depth formed in one end of each of the facing opposed plunger pairs so as to provide a spaced pair of said notches substantially in alignment when the plungers are in an oriented position disposed at and just below the top surface of said plungers to provide a receiving notch for each of said wire ends on the lowermost electrical component;
   (k) cam means and motive means adapted to engage and move the forward plungers in a rapidly reciprocated motion, said cam means providing a rearward displacement of the front plungers to bring the notches in way of the wire ends of the lowermost component to allow the wire ends of said component to drop into said notches as and when the rear plungers are moved rearwardly by and with the displacing movement of the front plungers, said rear plungers are moved from a wire end supporting condition, and
   (l) forward and downward guide means disposed so as to engage the wire ends of the lowermost component as it is carried in said notch, said guide means disposed to insure that the wire ends of the lowermost component drop from the dispenser through the space between the rear and front plungers when and while the front plungers are in and at their forwardmost position.

2. A high speed dispenser as in claim 1 in which the notch is formed in the rear of the front plungers.

3. A high speed dispenser as in claim 2 in which the chute is of sheet metal with the track path extending to the notch and then parallel to the top of a reciprocated plunger and then downwardly with one edge of the guide means providing a strip and stop gap for engaging the wires of a component from the dispenser.

4. A high speed plunger as in claim 3 in which the track is disposed in a zig-zag manner.

5. A high speed dispenser as in claim 1 in which the forward and rear plungers are generally rectangular in configuration and the bearing blocks are formed with mating bearing receiving means and there is provided cover means for securing the plungers in a desired bearing-mounted position.

6. A high speed dispenser as in claim 1 in which the rear plungers are biased by means of tension springs and the means to limit the forward travel of the rear plungers are pins that are secured in each plunger.

7. A high speed dispenser as in claim 1 in which the pins providing the limit stop for the plungers also provide a mounting means for one end of a tension spring.

8. A high speed dispenser as in claim 1 in which the forward plungers are each biased away from the rear plungers by compression springs mounted on the forward plungers.

9. A high speed dispenser as in claim 1 in which the cam is a cylindrical cam carried and rotated by a driven shaft, each cam actuation dispensing one component downwardly.

10. A high speed dispenser as in claim 1 in which the spacer means between the front and rear bearing blocks are removable and are secured to the blocks to rigidify the apparatus.

* * * * *

UNITED STATES PATENT AND TRADEMARK OFFICE
CERTIFICATE OF CORRECTION

PATENT NO. : 4,291,819

DATED : September 29, 1981

INVENTOR(S) : Martin G. Heller, Joel Rudder & Stanley J. Arasim, Jr

It is certified that error appears in the above—identified patent and that said Letters Patent is hereby corrected as shown below:

Col. 2, line 15, after "This" insert --disclosure, however is not intended to cover each new inventive concept no matter how it may later be disguised by variations in form or additions of further improvements. For this reason there has been chosen a specific embodiment of high speed dispensing apparatus as adopted for use in feeding electrical components to later operations and showing a preferred means for actuating said apparatus for a one-at-a-time dispensing at a high speed. This specific embodiment has been chosen for the purposes of illustration and description as shown in the accompanying drawing wherein:

Signed and Sealed this

Eighth Day of December 1981

[SEAL]

Figure 1:
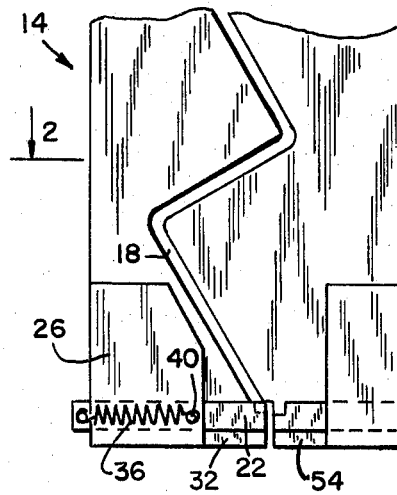
FIG. 1 represe---
Figure 2:
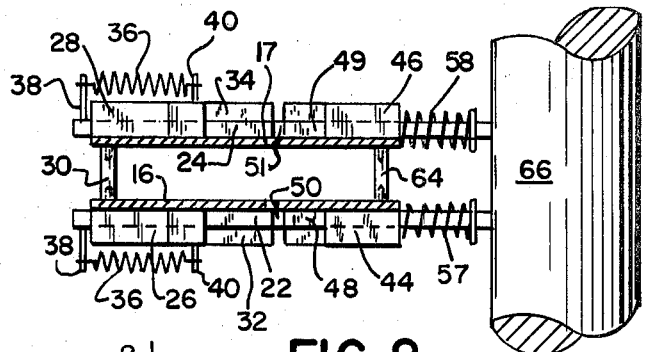
Figure 6:
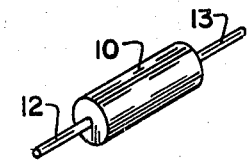
Figure 3:
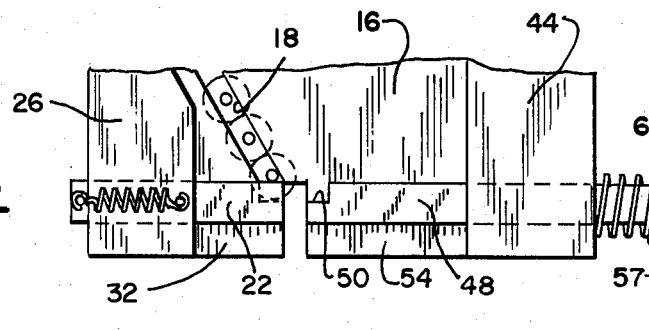
Figure 4:
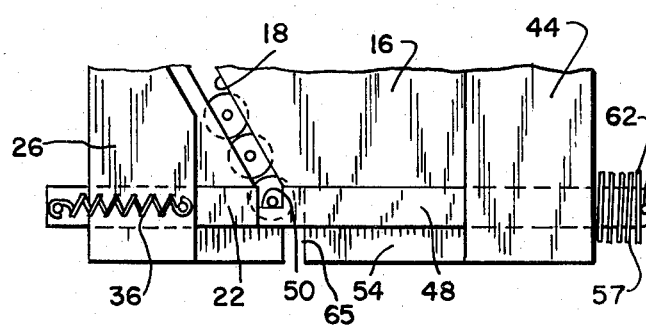
Figure 5:
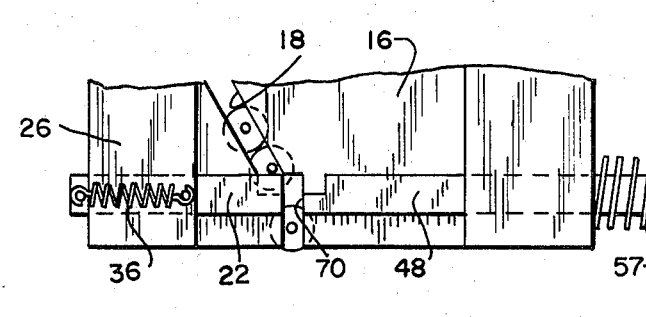

Attest:

Attesting Officer

GERALD J. MOSSINGHOFF

*Commissioner of Patents and Trademarks*